(12) United States Patent  (10) Patent No.: US 6,484,263 B1
Liu  (45) Date of Patent: Nov. 19, 2002

(54) SECURITY PROFILE FOR WEB BROWSER

(75) Inventor: Te-Kai Liu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,322

(22) Filed: Jan. 28, 1999

(51) Int. Cl.$^7$ ...................... G06F 713/201; G06F 15/16
(52) U.S. Cl. ...................................................... 713/201
(58) Field of Search ............................... 713/200, 201, 713/202; 709/218

(56) References Cited

U.S. PATENT DOCUMENTS

| | | | | |
|---|---|---|---|---|
| 5,455,953 A | * | 10/1995 | Russell | 395/739 |
| 6,065,120 A | * | 5/2000 | Laursen et al. | 713/201 |
| 6,182,229 B1 | * | 1/2001 | Nialsen | 713/202 |
| 6,199,077 B1 | * | 3/2001 | Inala et al. | 707/501 |
| 6,226,668 B1 | * | 5/2001 | Silverman | 709/204 |
| 2002/0026351 A1 | * | 2/2002 | Coleman | 705/14 |
| 2002/0032782 A1 | * | 3/2002 | Rangan et al. | 709/229 |

OTHER PUBLICATIONS

Phone Browser by Bell Labs. http://www.bell-labs.com/profect/tardis/portal/html Intergrated Web and Telephone Service Creation, Bell Labs Technical Journal, 1997.

* cited by examiner

Primary Examiner—Norman M. Wright
(74) Attorney, Agent, or Firm—Louis J. Percello; Harrington & Smith, LLP

(57) ABSTRACT

Disclosed is a system and method for accessing password-protected Web sites through Web browsers without manually supplying username and password by users. A browser maintains, for each user, one user security profile which stores the URLs and the corresponding login username and password. When the browser receives a username-password challenge from a Web server, instead of immediately prompting the user for such information, the browser first searches the user security profile for the URL the challenge is received from. If a match is found, the browser sends the challenging Web server the username and password that is associated with the matched URL. Thus the user does not have to manually supply the username and password once the triple of (URL, username, password) is stored in the user security profile. This feature is especially valuable for users of voice browsers and phone browsers.

9 Claims, 3 Drawing Sheets

SECURITY PROFILE FOR WEB BROWSER

FIELD OF THE INVENTION

The present invention generally relates to accessing World Wide Web using Web browsers, and more particularly to a new user security profile feature for Web browsers.

BACKGROUND OF THE INVENTION

Today, people use Web browsers such as Netscape browsers and Internet Explorer to communicate with Web servers which serve Web pages to browsers by the HyperText Transfer Protocol (HTTP). The HTTP protocol is a client-server protocol where HTTP clients (also known as browsers) send the Web server the identifier of the Web page (commonly known as URL or Uniform Resource Locator) that the user wants to retrieve. Upon receiving the URL sent by the browsers, a Web server sends the requested page to the requesting browsers and the browsers present the received page to the users via a graphical user interface (GUI). A Web page typically contains hyperlinks that point to other Web pages; users can request these pages by clicking on the hyperlink. A user can save the URL of the Web page he is visiting in a bookmark file so that he can revisit the page next time by just clicking on the corresponding bookmark entry. A user can also retrieve a Web page by typing the URL as a text string into the browser.

In addition to the aforementioned browsers with a graphical user interface (GUI), there exists other types of browsers which do not have GUI. An example is voice browsers which can be used by people with impaired vision or people whose eyes are not available while navigating the Web, e.g., automotive drivers. With the lack of a GUI interface, a voice browser typically employs text-to-speech technology to covert the text information of Web pages into speech signals and speech recognition technology to recognize what the user said. With the maturity today's speech technology, a user typically say the number or the keywords that are associated with the page he wants to get. With such a restricted user interface, it is very difficult for users to specify a URL by spelling out the URL letter by letter or word by word.

Another example of browsers without GUI interface is a phone browser system. FIG. 1 shows a system diagram of a typical phone browser system. The phone browser system allows a telephone user to access the Web pages (not shown) residing at Web servers 170 on the Internet. The system works as follows. A caller picks up a phone 105 and dials the phone number corresponding to the URL of the Web page that he/she wants to reach. The phone call will be routed by the PSTN (public switch telephone network) 110 to a IVR platform 120 which on one hand interfaces with the PSTN I 10 and on the other hand interfaces with the Internet 150, to which a phone browser 160 and a Web server 170 are connected. The phone call will be picked up at the IVR platform 120 by the call handling routine 122 which will find the destined URL by looking up the phone number/URL table 124 based on the phone number the caller dialed. The call handling routine 122 then proceeds to establish a session with a phone browser 160 and initializes the phone browser 160 with the selected URL by a proprietary protocol, called V protocol. The phone browser 160 then interacts with the Web server 170 hosting the destined URL by the HTTP protocol.

The IVR platform 120 interfaces with the PSTN via a telephony interface 128 which includes DTMF (Dual-Tone Multi-Frequency) detection, call answering/disconnecting, digital-to-analog and analog-to-digital converters, etc. The IVR platform 120 includes audio functions 126 such as text-to-speech converters, audio players, audio recorders, etc. The information (e.g. text and audio) obtained from the Web server 170 is first processed by the phone browser 160 (e.g., appending a voice menu at the end of the page.) The processed information is then sent to the call handling routine 122 via V protocol. The received information at the call handling routine 122 is presented to the caller after the necessary conversion is done at the IVR platform 120. The caller now listens to the transformed Web page in speech and chooses the next URL by pressing the corresponding touch-tone button on the phone 105 according to the voice menu presented to the caller by the call handing routine 122. The call handling routine 122 converts the received DTMF tone into a digital format (e.g., ASCII text) and sends it to the phone browser for the next Web page. The process repeats till the caller hangs up the phone. Similar to the situation in a voice browser system, it is very difficult for a user to supply a URL in text in a phone browser system.

PROBLEMS WITH THE PRIOR ART

With the growing awareness of security and privacy, today many Web sites require users sign up and set up a login username and password when users first visit their Web sites. When a user tries to download a page that is password protected, the browser will prompt the user to supply username and password as a result of receiving a password challenge from the Web server hosting the page. As such, each user has to manage a list of login information (i.e., URL, username, and password) for each site he signs up and manually supply the username and password every time he visits these sites.

For a browser with GUI, it is extra work to manage the many usernames and passwords for all the sites that are password protected. Some users may find it inconvenient to supply username and password each time a password-protected site is visited. For browsers without GUI such as voice browsers and phone browsers, it is very difficult to for users to tell the browsers username and password.

OBJECTS OF THE INVENTION

An object of this invention is a method for users to access password-protected Web sites without manually supplying username and password for each visit of the sites.

Another object of the invention is a method for telephone users to access password-protected web sites without supplying username and password information over the phones.

SUMMARY OF THE INVENTION

The present invention is a system and method for accessing password-protected Web sites through Web browsers without manually supplying a username and password by the users. The invention requires a browser maintains, for each user, one user security profile which stores the URLs and the corresponding login username and password. When the browser receives a username-password challenge from a Web server, instead of immediately prompting the user for such information, the browser first searches the user security profile for the URL the challenge is received from. If a match is found, the browser sends the challenging Web server the username and password that is associated with the matched URL. Thus the user does not have to manually supply the username and password once the triple of (URL, username, password) is stored in the user security profile.

This feature is especially valuable for users of voice browsers and phone browsers.

BRIEF DESCRIPTION OF THE FIGURES

The foregoing and other objects, aspects, and advantages will be better understood from the following non limiting detailed description of preferred embodiments of the invention with reference to the drawings that include the following.

DETAILED DESCRIPTION OF THE INVENTION

Figure 1:
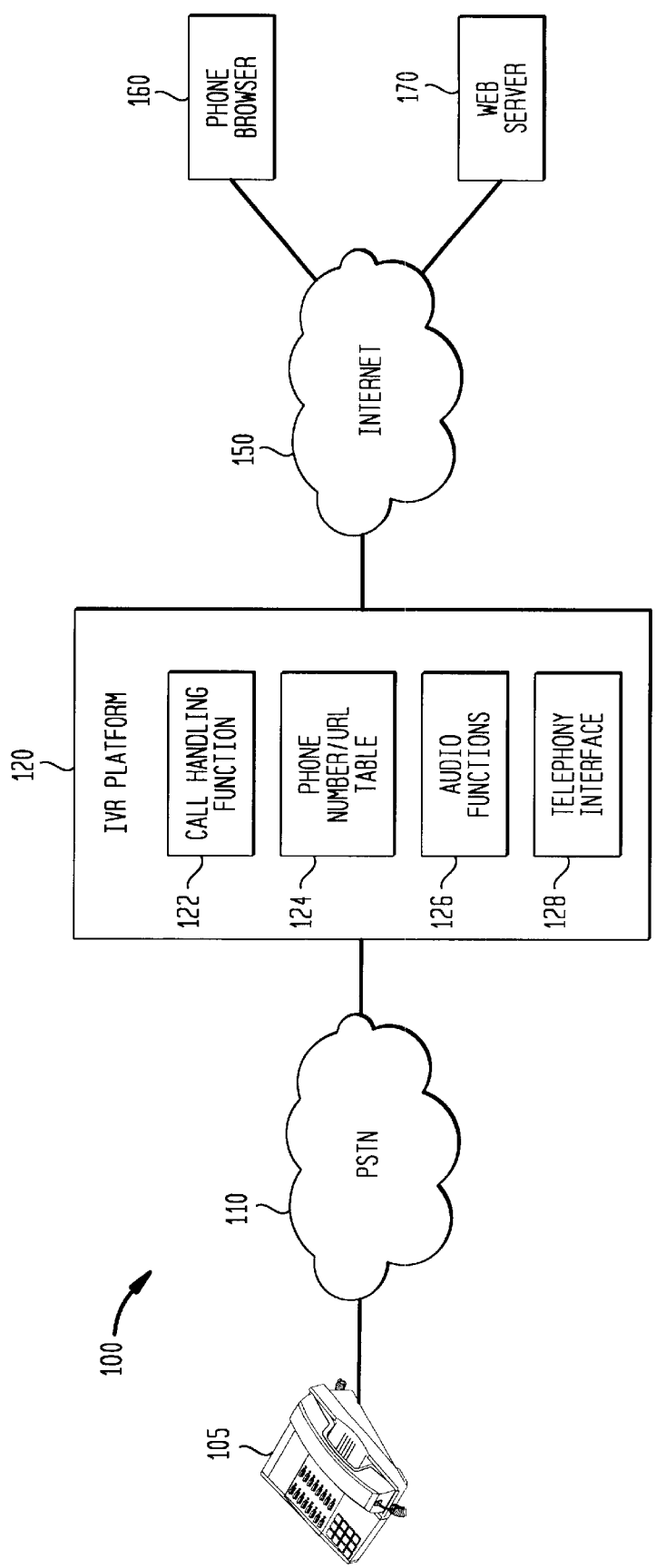
FIG. 1 is a prior art system diagram for a typical phone browser system.
Figure 2:
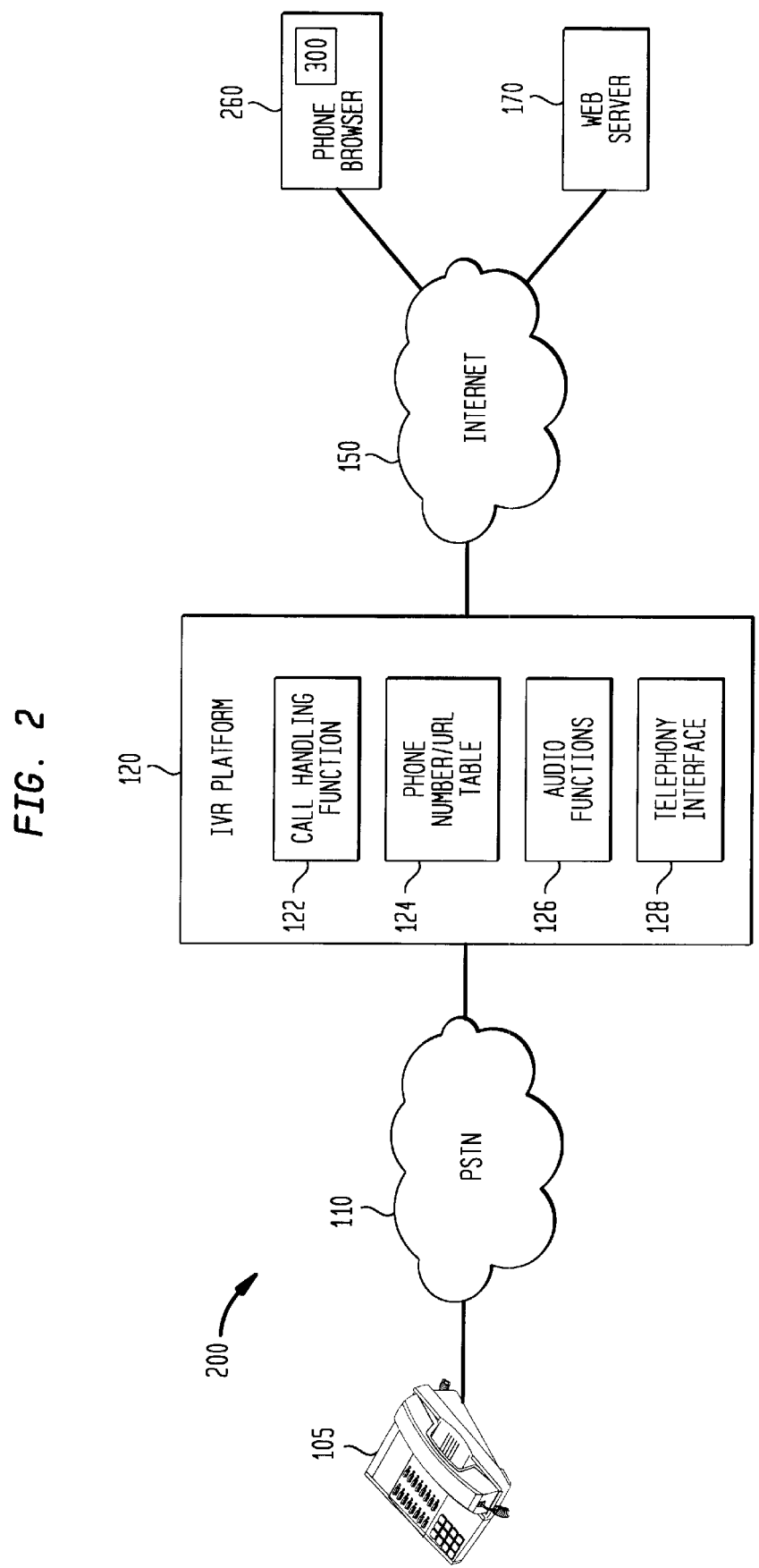
FIG. 2 is a block diagram of the present invention operating on a phone browser system.

FIG. 2 is a block diagram of the present invention operating with a phone browser system. One preferred system is described in U.S. patent application Ser. No. 09/239,329 entitled "A Dynamically Reconfiguable Distribute Interactive Voice Response System" to Liu et al. filed on the same day as this invention and which is herein incorporated by reference in its entirety. A key element in the present invention is a security profile associated with each user of a browser. The profile stores a triple of URL, username, and password for each Web site that the user has the authorization to log on with the associated username and password. The process 300 of FIG. 3 uses this profile.

Figure 3:
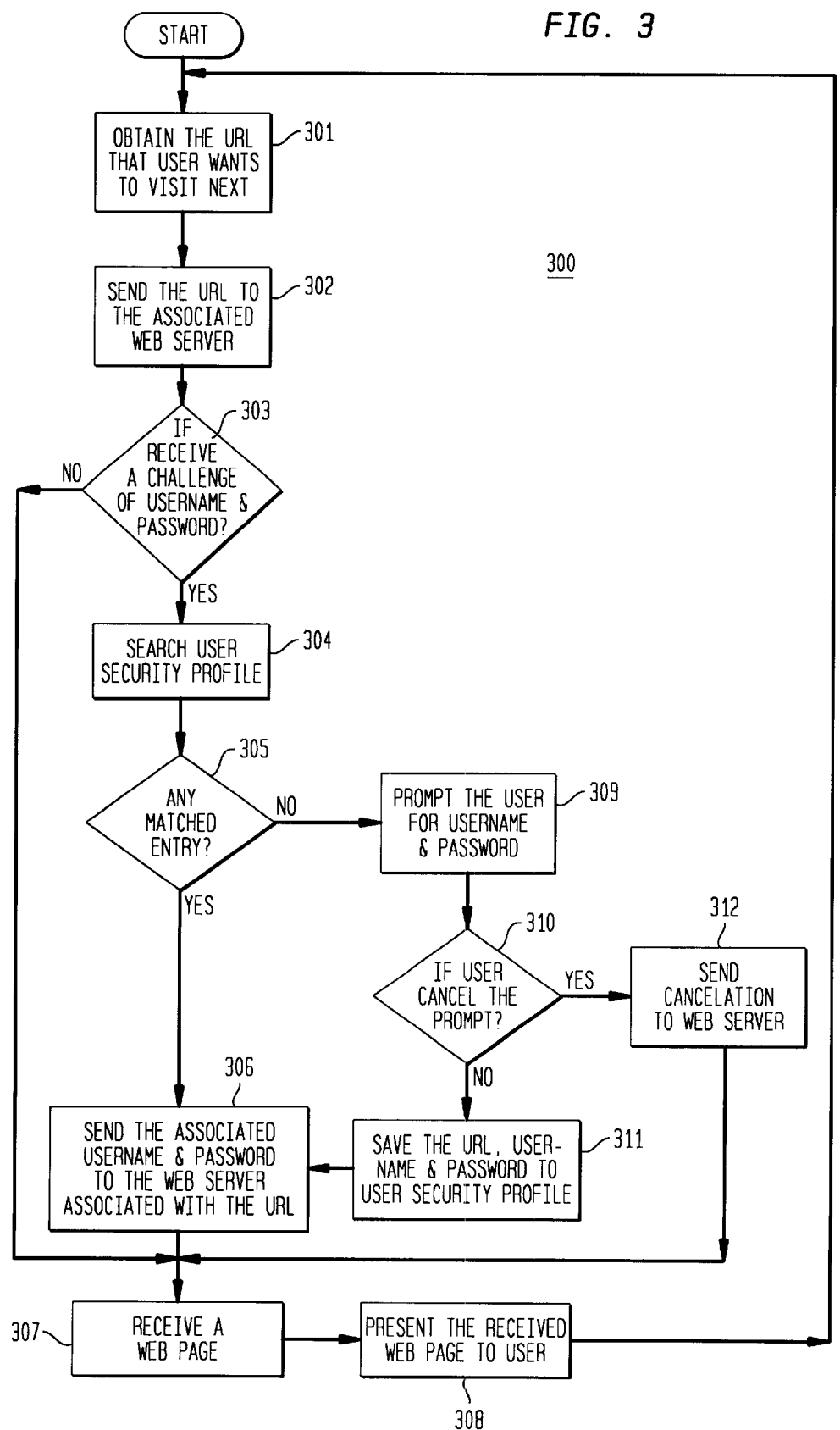
FIG. 3 is a flowchart describing how a browser utilizes the security profile in the present invention to help users navigate the Web.

The use of the security profile by a browser is shown by a process 300 given by the flowchart in FIG. 3. The browser first, in step 301, obtains the URL of the next site the user wants to visit.

In the case of a GUI browser, this can be done by user's clicking on a hyperlink, a bookmark entry, or typing the text of the URL. For a non-GUI browser such as voice browsers and phone browsers, the user specifies the target URL by pressing the touchtone buttons on the phone or by speaking the number or the keyword that corresponds to the target URL. The browser then sends the target URL to the associated Web server in step 302. In the next step 303, the browser checks if the Web server returns a challenge of username and password: If the response from the Web server is not a challenge, the browser receives the page in step 307, presents the page to the user in step 308, and goes back to step 301. If in step 303 a challenge is received, the browser searches the user security profile for the URL in step 304. If a match is found in step 205, the browser sends the associated username and password to the Web server in step 306 and receives a response page in step 307. If a match is not found in step 305, the browser prompts the user for username and password in step 309. Now the user can respond in two ways. If the user cancels the prompt in step 310, the browser sends a cancellation notice to the Web server in step 312 and goes to step 307. However, the web page sent/received in this case will reflect that the user was not properly authenticated, i.e., an error message may be returned. If the user supplies the username and password in step 310, the browser saves the URL, username and password to the user security profile in step 311 and sends the username and password to the challenging Web server in step 306.

I claim:

1. A computer system having one or more memories, one or more central processing units and one or more network interfaces, the computer system further comprising:

a browser;

a security profile having a plurality of records, each record having a URL, a user name associated with the URL, and a password associated with the user name; and a browser process that identifies a target URL for one or more password-protected web sites that a user desires to access, associating the target URL with one or more of the URLs in the security profile.

2. A system, as in claim 1, where the browser process further provides the respective associated user name and password to the password-protected web site when the password-protected web site challenges the browser.

3. A system, as in claim 2, where the browser fails to find a matched URL and prompts the user to manually supply username and password.

4. A system, as in claim 1, where the browser is any computer process which uses the HyperText Transfer Protocol to access Web sites.

5. A system, as in claim 1, where the browser is a HTTP client.

6. A system, as in claim 5, where the HTTP client does not have a graphical user interface and includes any one or more of the following: a phone browser and a voice browser.

7. A computer browser process comprising the steps of:

accessing a password-protected web site with a target URL;

matching the target URL with a record in a security profile with a plurality of records, each record having a URL, a user name associated with the URL, and a password associated with the user name; and providing the user name and password to the password-protected web site when password-protected web site challenges the browser.

8. A computer browser program product which performs the steps of:

accessing a password-protected web site with a target URL;

matching the target URL with a record in a security profile with a plurality of records, each record having a URL, a user name associated with the URL, and a password associated with the user name; and providing the user name and password to the password-protected web site when password-protected web site challenges the browser.

9. A computer browser comprising:

means for accessing a password-protected web site with a target URL;

means for matching the target URL with a record in a security profile with a plurality of records, each record having a URL, a user name associated with the URL, and a password associated with the user name; and means for providing the user name and password to the password-protected web site when password-protected web site challenges the browser.

* * * * *